(12) United States Patent
Hoffstadt et al.

(10) Patent No.: US 11,198,516 B2
(45) Date of Patent: *Dec. 14, 2021

(54) SYSTEM TO ACCELERATE AND DECELERATE AIRCRAFT FOR TAKE-OFF AND LANDING

(71) Applicant: THE BOEING COMPANY, Chicago, IL (US)

(72) Inventors: Brett M. Hoffstadt, San Antonio, TX (US); William A. Harkness, Seattle, WA (US); Royal E. Meservy, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 369 days.

This patent is subject to a terminal disclaimer.

(21) Appl. No.: 16/453,820

(22) Filed: Jun. 26, 2019

(65) Prior Publication Data

US 2019/0315487 A1 Oct. 17, 2019

Related U.S. Application Data

(60) Division of application No. 16/103,540, filed on Aug. 14, 2018, now Pat. No. 10,377,504, which is a continuation of application No. 14/547,826, filed on Nov. 19, 2014, now Pat. No. 10,059,465.

(51) Int. Cl.
*B64F 1/06* (2006.01)
*B64F 1/02* (2006.01)
*B64F 1/22* (2006.01)

(52) U.S. Cl.
CPC ............. *B64F 1/06* (2013.01); *B64F 1/02* (2013.01); *B64F 1/22* (2013.01); *Y02T 50/80* (2013.01)

(58) Field of Classification Search
CPC ..... B64F 1/06; B64F 1/002; B64F 1/22; B64F 1/04; B64F 1/24
USPC ...................................................... 244/110 E
See application file for complete search history.

(56) References Cited

U.S. PATENT DOCUMENTS

| | | | |
|---|---|---|---|
| 2,197,300 | A | 4/1940 | Fleet et al. |
| 2,413,724 | A | 1/1947 | Maxson et al. |
| 3,380,690 | A | 4/1968 | Rego |
| 3,408,768 | A | 11/1968 | Glass et al. |

(Continued)

FOREIGN PATENT DOCUMENTS

| | | |
|---|---|---|
| EP | 2282939 B1 | 7/2011 |
| EP | 2282938 B1 | 9/2011 |

OTHER PUBLICATIONS

"UAV Launch and Recovery," Zodiac AeroSpace, Mastering the Elements, <http://www.zodiacaerospace.com/en/our-products/aerosafety/arresting-systems/military-systems/uav-launch-revcovery-systems/line/auv-launch-recovery> retrieved on Nov. 19, 2014, 1 pg.

(Continued)

*Primary Examiner* — Christopher P Ellis
(74) *Attorney, Agent, or Firm* — Moore Intellectual Property Law, PLLC

(57) ABSTRACT

A system for controlling aircraft movement includes a frame extending across a width of a runway. The system includes an attachment mechanism coupled to the frame and configured to be releasably connected to a portion of an aircraft. The system includes a conveying system configured to, with the aircraft coupled to the frame during take-off of the aircraft, accelerate the aircraft. The conveying system is further configured to, during landing of the aircraft, decelerate the aircraft.

20 Claims, 10 Drawing Sheets

(56) References Cited

U.S. PATENT DOCUMENTS

| | | | |
|---|---|---|---|
| 3,428,273 A | 2/1969 | Tyler | |
| 7,232,092 B2 | 6/2007 | Yamamoto | |
| 8,028,953 B2 | 10/2011 | Hosaka et al. | |
| 8,485,468 B2 | 7/2013 | Binnebesel | |
| 9,079,671 B2 | 7/2015 | Endres | |
| 9,156,564 B2 | 10/2015 | Endres | |
| 9,302,768 B2 | 4/2016 | Yang | |
| 2017/0107000 A1 | 4/2017 | Endres | |
| 2017/0137149 A1 | 5/2017 | Malicki | |

OTHER PUBLICATIONS

"Ground Carriage," Wikipedia, <https://en.wikipedia.org/wiki/Ground_carriage> published on Oct. 20, 2014., 3 pgs.

Harris, Tom, "How Aircraft Carriers Work," HowStuffWorks, <http://science.howstuffworks.com/aircraft-carier3.htm> retrieved on Nov. 19, 2014, 3 pgs.

"Aircraft Catapult," Wikipedia, <http://en.wikipedia.org/wiki/Aircraft_catapult> retrieved on Nov. 19, 2014, 4 pgs.

Launchers-Insitu, <http://www.insitu.com/systems/launch-and-recovery/launchers> retrieved on Nov. 19, 2014, 4 pgs.

SYSTEM TO ACCELERATE AND DECELERATE AIRCRAFT FOR TAKE-OFF AND LANDING

CROSS-REFERENCE TO RELATED APPLICATIONS

This application claims priority from and is a divisional of U.S. patent application Ser. No. 16/103,540, entitled "SYSTEM TO ACCELERATE AND DECELERATE AIRCRAFT FOR TAKE-OFF AND LANDING," filed Aug. 14, 2018, which is a continuation of U.S. patent application Ser. No. 14/547,826, entitled "SYSTEM TO ACCELERATE AND DECELERATE AIRCRAFT FOR TAKE-OFF AND LANDING," filed Nov. 19, 2014, the entire contents of which are expressly incorporated herein by reference.

FIELD

This invention relates to systems to facilitate take-off and landing of aircraft, and more particularly, to provide acceleration to the aircraft for take-off and to provide deceleration to the aircraft for landing.

BACKGROUND

Engines on commercial passenger jets are sized for take-off conditions. This design condition drives engine sizes that are larger than necessary for every other phase of the aircraft flight. The larger sized engine for take-off conditions results in higher purchase costs than would be needed otherwise to operate the aircraft. The larger engine size also results in higher cost of operation with adding weight to the aircraft, creating additional drag to the aircraft, adding fuel consumption, and affecting range of the aircraft. Eliminating this design condition and the engine mechanism to bring the aircraft to a cruise condition would improve operating efficiencies and costs.

Take-off and climb-out noise from commercial aircraft engines is a contributor to noise pollution near airports. Eliminating the design condition of the engines being sized for take-off conditions would reduce noise pollution.

At least some commercial aircraft are reliant on the onboard propulsion from the engines for take-off. An alternative to traditional commercial aircraft take-off is military aircraft use of steam or electromagnetic catapults on aircraft carriers. Another option is found in use with sailplanes. Sailplanes can be towed by a powered aircraft to launch altitude.

With respect to landing, commercial aircraft utilize thrust reversers to decelerate the aircraft. Use of thrust reversers consumes fuel and contributes to noise pollution near the airport. In addition, landing on runways imparts wear to the tires of the landing gear. In the military, aircraft carriers utilize catch line systems to decelerate the aircraft.

Airport runway sizes may be limited by geography, such as water, mountains or existing structures. Runway size may also be limited by monetary considerations or climate conditions, such as thin air. As such, some runways may not be long enough for larger aircraft to use for take-off and landing. Further, some runways may be closed to take-offs and landings due to weather conditions, such as rain or ice causing cancelled or delayed flights.

SUMMARY

An example of a system for controlling movement of an aircraft includes a platform for supporting the aircraft and a clamp mechanism coupled to the aircraft platform to releasably couple the aircraft onto the platform. A conveying system is coupled to the platform and configured to move the platform to accelerate or decelerate the aircraft coupled to the platform is also provided.

An example of a system for controlling movement of an aircraft includes a frame positioned above a runway and extending across a width of the runway. The system includes an attachment mechanism secured to the frame and releasably coupled to at least one landing gear of an aircraft. The system also includes a conveying system positioned on opposing sides of the runway and extending in a direction along a length of the runway. The frame is coupled to the conveying system to accelerate the aircraft.

An example of a runway system for controlling movement of an aircraft which includes a recess defined in a surface of a taxiway. Also included is a barrier positioned at at least one of a first end portion of the recess and a second end portion of the recess.

The features, functions, and advantages that have been discussed can be achieved independently in various embodiments or may be combined in yet other embodiments further details of which can be seen with reference to the following description and drawings.

While various embodiments have been described above, this disclosure is not intended to be limited thereto. Variations can be made to the disclosed embodiments that are still within the scope of the appended claims.

DETAILED DESCRIPTION

Figure 1:
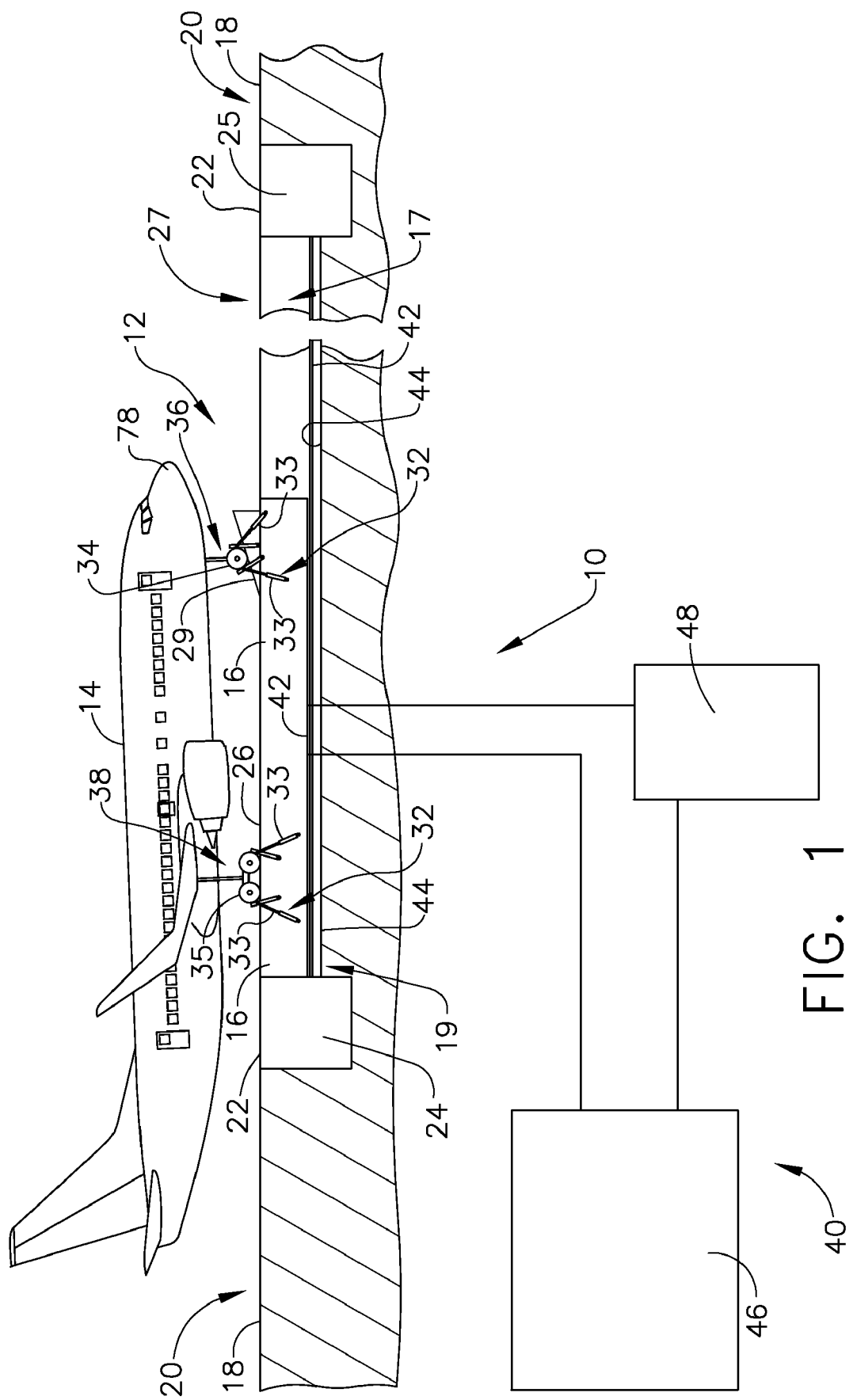
FIG. 1 a schematic partial cross section side elevation view of a first embodiment of the system for controlling movement of an aircraft and a runway system for controlling movement of an aircraft.
Figure 2:
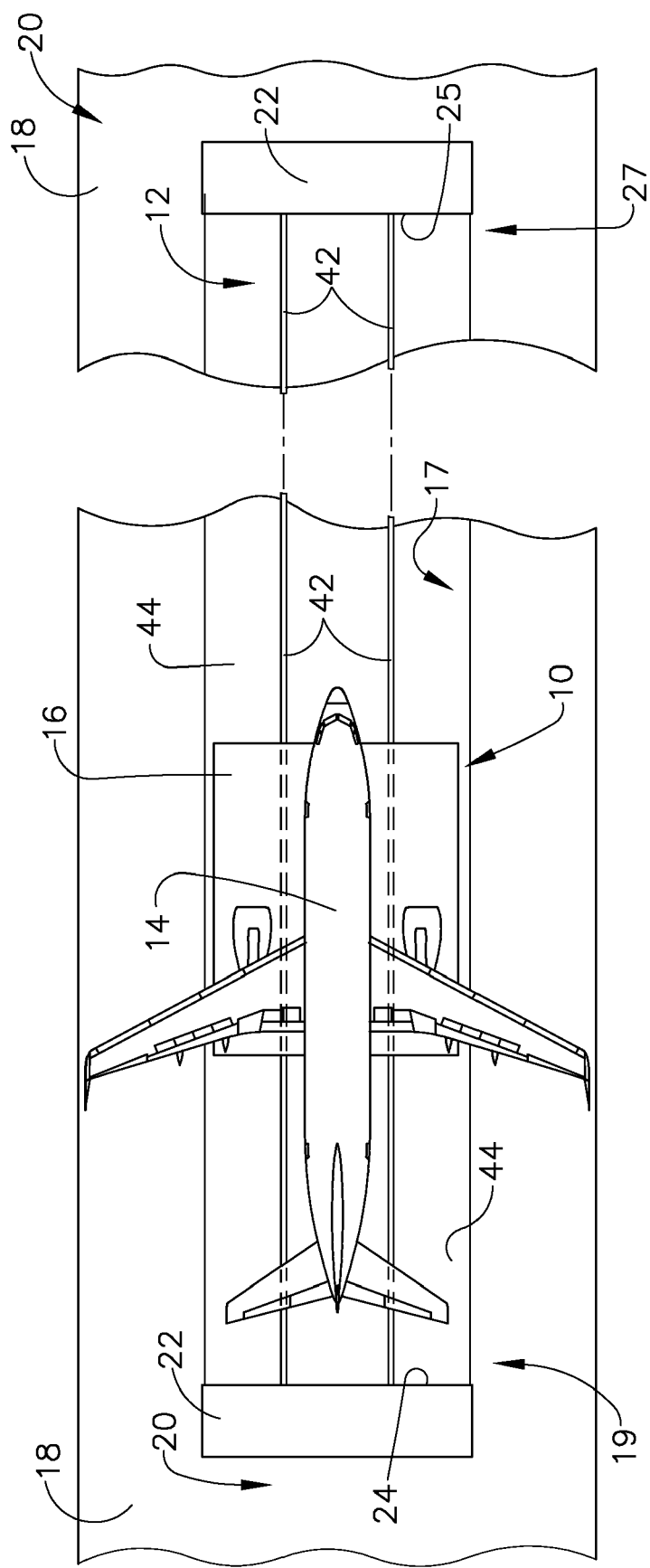
FIG. 2 is a schematic top plan view of FIG. 1.

In referring to a FIGS. 1 and 2, a first example of a first embodiment of system 10 for controlling movement of an aircraft 14 is shown. Also, runway system 12 for controlling movement of an aircraft 14 is shown. System 10 for controlling movement of an aircraft 14 includes components that provide acceleration and deceleration to aircraft 14 for take-off and landing of aircraft 14. Runway system 12 for controlling movement of an aircraft 14 includes components that provide infrastructure at the airport to facilitate take-off and landing of aircraft 14.

In this first example of the first embodiment of system 10 for controlling movement of an aircraft 14, a platform 16 is provided for supporting aircraft 14. As will be discussed in further detail herein, aircraft 14 is releasably coupled to platform 16, and platform 16 is accelerated to facilitate take-off of aircraft 14. Aircraft 14, at time of landing, lands upon platform 16 and is releasably coupled to platform 16. Platform 16 is decelerated, and platform 16 and aircraft 14 are brought to a stop.

In preparing for take-off, aircraft 14 taxis across a surface 18 of a taxiway 20. Taxiway 20 includes a support surface 22 positioned above first barrier 24. First barrier 24 is used to decelerate platform 16 without damaging platform 16, as will be herein discussed in more detail. In this first example of the first embodiment of system 10, platform 16 is positioned within a recess 17 defined below grade or below surface 18 of taxiway 20. Taxiway 20 is used by aircraft 14 to taxi to recess 17 and access platform 16. In order for aircraft 14 to access platform 16, platform 16 is positioned at first end portion 19 of recess 17 with platform 16 positioned adjacent to first barrier 24 and support surface 22. With platform 16 positioned adjacent to support surface 22, a top surface 26 of platform 16 is positioned substantially parallel to and at substantially the same elevation as support surface 22 and surface 18 of taxiway 20. The alignment of support surface 22 and top surface 26 of platform 16 permits a smooth transition for aircraft 14 to taxi onto platform 16.

In this example, a second barrier 25 is positioned at second end portion 27 of recess 17. This second barrier 25 is also used to decelerate platform 16 without damaging platform 16 when platform 16 is traveling toward second end portion 27. Similarly constructed to first end portion 19 of recess 17, second end portion 27 has support surface 22 positioned above second barrier 25. With platform 16 positioned adjacent to support surface 22 at second end portion 27, the top surface 26 of platform 16 is positioned substantially parallel to and at substantially the same elevation as support surface 22 and surface 18 of taxiway 20. The alignment of support surface 22 and top surface 26 of platform 16 permits a smooth transition for aircraft 14 to taxi onto platform 16 at second end portion 27 of recess 17. With this construction at both first end portion 19 and second end portion 27, aircraft 14 also has a smooth transition in taxiing off of platform 16 at both first end portion 19 and second end portion 27.

Figure 6:
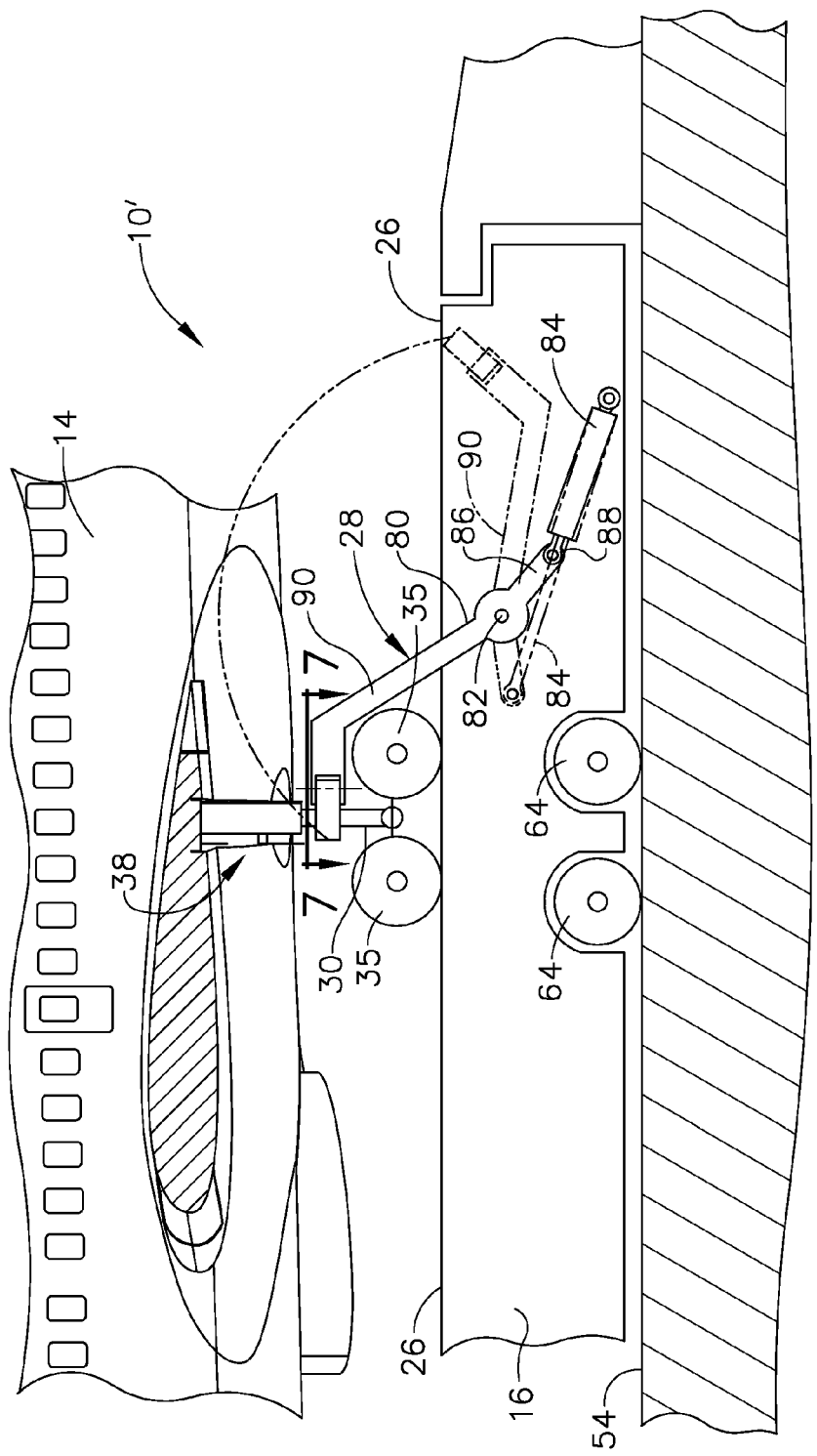
FIG. 6 is a schematic partial side elevation view of an example of the clamp mechanism for a rear landing gear of an aircraft of the system for controlling movement of an aircraft.
Figure 7:
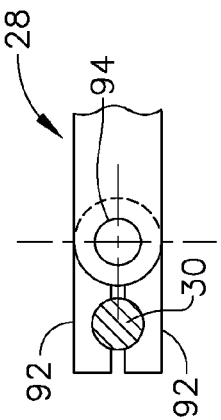
FIG. 7 is a schematic cross section view taken along line 7-7 in FIG. 6.
Figure 8:
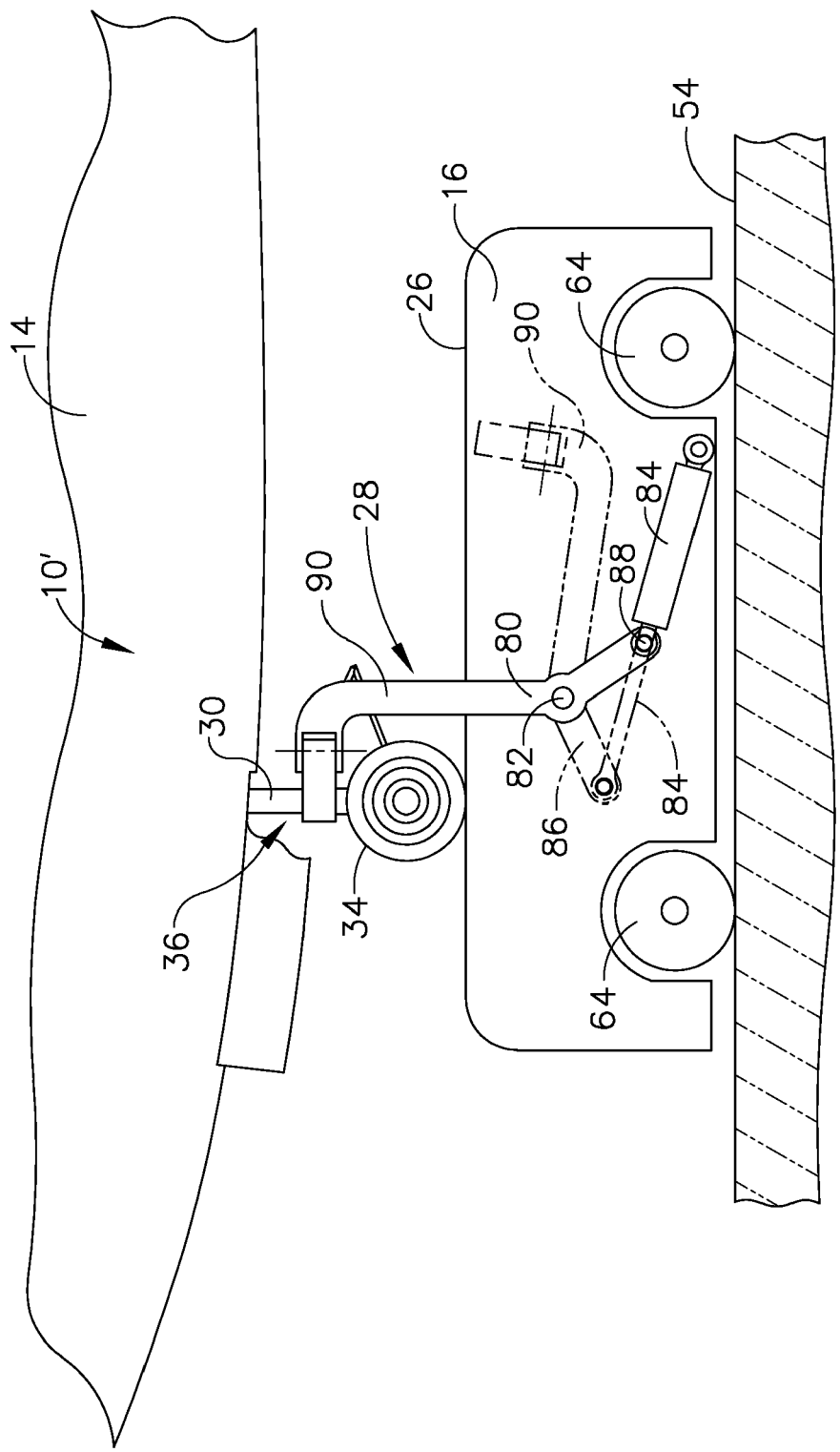
FIG. 8 is a schematic side elevation view of the example of the clamp mechanism of FIG. 6, for a front landing gear of an aircraft.

Once aircraft 14 is positioned onto top surface 26 of platform 16, aircraft 14 is releasably coupled to platform 16. Clamp mechanisms 28, which are coupled to platform 16, as shown in FIGS. 6-8, are used to releasably couple aircraft 14 to platform 16. Clamp mechanism 28 will be discussed below in more detail. With aircraft 14 positioned on top surface 26 of platform 16, either in preparation for acceleration and take-off or having landed on platform 16 for deceleration, clamp mechanisms 28 are releasably coupled to each of front and rear struts 30 of aircraft 14, as seen in FIGS. 6 and 8. Clamp mechanism 28 couples to and secures struts 30 of aircraft 14 to platform 16 to maintain aircraft 14 on platform 16 during a take-off acceleration movement of platform 16 and decouples and releases struts 30 at the time of take-off of aircraft 14 from top surface 26 of platform 16.

Clamp mechanisms 28 also couples and secures struts 30 of aircraft 14 to platform 16 at the time aircraft 14 lands on platform 16. Clamp mechanism 28 maintains aircraft 14 secured onto platform 16 during deceleration of platform 16 in bringing aircraft 14 to a stop. Clamp mechanism 28 decouples from struts 30 after aircraft 14 has come to a stop to permit aircraft 14 to taxi off of platform 16.

Figure 3:
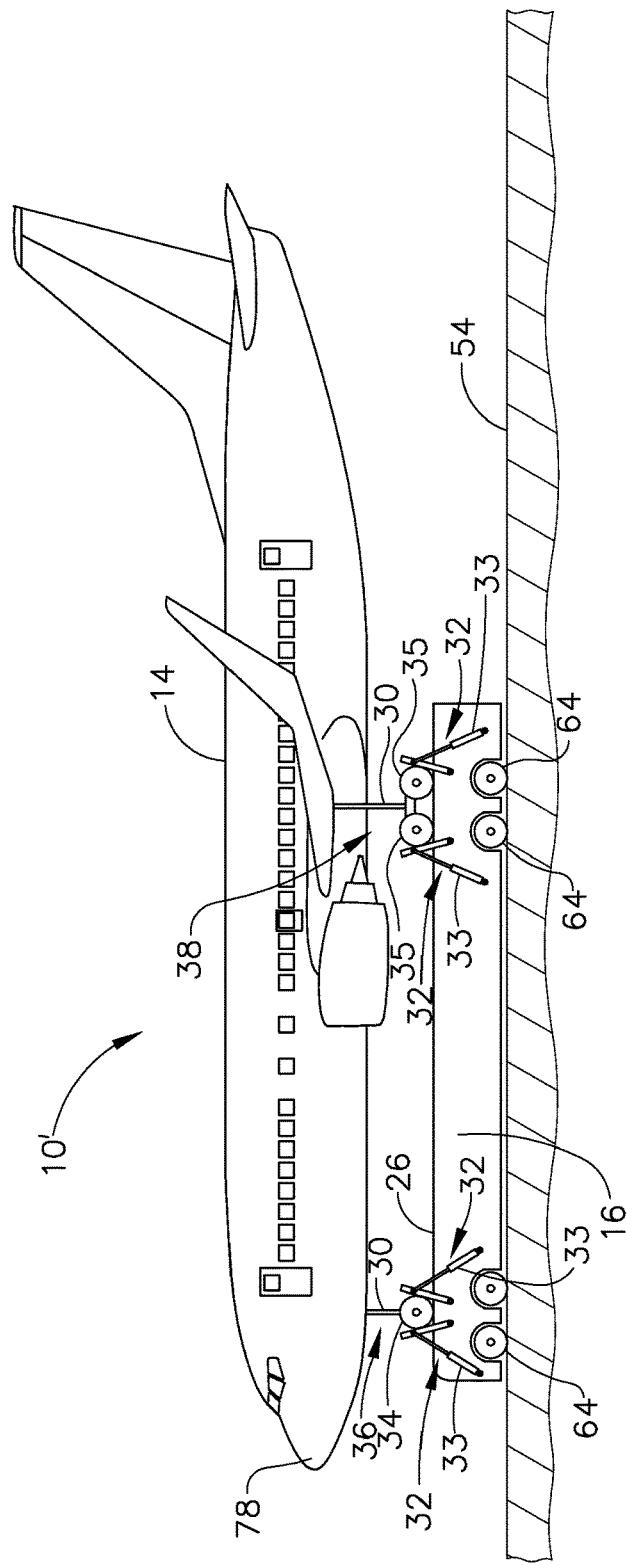
FIG. 3 is a schematic side elevation view of a first example of a platform of the system for controlling movement of an aircraft.

In addition to clamp mechanisms 28, additional releasable securement devices can be employed, such as, wheel blocks 32, as seen in FIGS. 1 and 3. Wheel blocks 32 include a pair of hydraulically, in this example, moveable arms 33 secured to platform 16. Moveable arms 33 are moveable relative to platform 16. Wheel blocks 32 are positioned on opposing sides, front and back, of wheels 34 of front landing gear 36 and when raised into position, abut opposing sides of wheels 34 of front landing gear 36 to prevent wheels 34 from rolling. Wheel blocks 32 associated with rear landing gear 38, similarly have moveable arms 33. Moveable arms 33 are positioned on opposing sides of wheels 35 of rear landing gear 38 and when raised into position, abut opposing sides of wheels 35 to prevent wheels 35 from rolling. In this example, with clamp mechanisms 28 coupled to struts 30 of aircraft 14 and wheel blocks 32 placed in blocking position with respect to wheels 34 and 35, aircraft 14 is releasably coupled to platform 16.

With aircraft 14 coupled to platform 16 for take-off, propulsion can be applied to platform 16 to accelerate platform 16 to attain sufficient velocity to enable aircraft 14 to take-off. At take-off, clamp mechanisms 28 are uncoupled from struts 30 and wheel blocks 32 are released from wheels 34 and 35. With respect to landing aircraft 14, clamp mechanisms 28 couple to struts 30 of aircraft 14 with aircraft 14 wheels 34 and 35 engaging platform 16 and couple aircraft 14 to platform 16. With aircraft coupled to platform 16, at the time of landing aircraft 14, in this example, wheel blocks 32 are raised on platform 16 and are positioned in blocking relationship with wheels 34 and 35, as described above. Struts 30 and wheels 34 and 35 are released by clamp mechanism 28 and wheel blocks 32, respectively, after aircraft 14 and platform 16 have stopped and aircraft 14 is positioned to taxi off of platform 16.

System 10 further includes a conveying system 40 coupled to platform 16 to move platform 16, in this first example, along and within recess 17. Platform 16 is positioned within recess 17 and above a floor 44 of recess 17. Conveying system 40 provides power to system 10 to provide acceleration and deceleration of platform 16 to facilitate take-off and landing of aircraft 14. Power for conveying system 40 can be selected from a variety of power generation mechanisms such as electromagnetic, electromechanical, steam or the like. In this example, electromagnetic power is utilized. Conveying system 40 includes at least one rail and in this example, a pair of rails 42, positioned to extend in a direction along a length of floor 44 in recess 17. Conveying system 40 also includes an electrical power supply 46 electrically connected to pair of rails 42. Platform 16 includes magnets positioned above pair of rails 42 providing a magnetic force causing platform 16 to levitate above pair of rails 42 and floor 44 with electrical power provided to pair of rails 42 from electrical power supply 46. The same electrical power provided to pair of rails 42 provides linear movement to platform 16 due to electromagnetic force exerted onto the magnets positioned on platform 16. Platform 16 is coupled to pair of rails 42 with magnets and/or wheels engaging opposing lateral sides of each rail of pair of rails 42, or other like structure for maintaining platform 16 aligned with pair of rails 42.

With respect to take-off of aircraft 14, aircraft 14 is releasably coupled to platform 16. Platform 16 is accelerated along recess 17 toward a second end portion 27 of recess 17, as seen in FIG. 2. Aircraft 14 is released from platform 16 when a take-off condition is attained. With aircraft 14 separated on take-off from platform 16, platform 16 is then decelerated. Should platform 16 have residual velocity at the time platform 16 reaches second barrier 25, platform 16 impacts second barrier 25 at second end portion 27 of recess 17 bringing platform 16 to a stop. Each of first barrier 24 and second barrier 25 are constructed of an energy absorbing material such as sand, foam, or the like, preventing imparting damage to platform 16.

Platform 16, at this point, in this example, can be returned along pair of rails 42 in a reverse direction from take-off to first end portion 19 for use for a subsequent take-off. The return of platform 16 to first end portion 19 is also accomplished through use, for example, of a curved looped track on or below grade to return platform 16 back to first end portion 19.

In this example, with respect to landing aircraft 14, platform 16 is accelerated from second end portion 27 of recess 17 toward first end portion 19 of recess 17 to match the landing speed of incoming landing aircraft 14. Platform 16 receives wheels 34 and 35 of front landing gear 36 and rear landing gear 38 of aircraft 14, at which time, clamp mechanism 28 couples to struts 30 of aircraft 14 coupling aircraft 14 onto platform 16. With aircraft 14 coupled to platform 16, platform 16 decelerates and comes to a stop. Platform 16 is then moved to first end portion 19 of recess 17. Aircraft 14 is uncoupled from platform 16 by decoupling clamp mechanisms 28 from struts 30 and removing wheel blocks 32 from blocking positions. Aircraft 14 taxis off of top surface 26 of platform 16 onto support surface 22. Aircraft 14 taxis from support surface 22 onto taxiway 20 and taxis back to the terminal. After aircraft 14 has taxied off of platform 16, platform 16 as described above, can be, in this example, returned to second end portion 27 for subsequent use.

The operations of system 10 for controlling movement of an aircraft 14, while aircraft 14 is positioned on platform 16, are controlled by a controller 48. Controller 48 includes a memory for storing algorithms that are executed by a processor. Controller 48 is connected to conveying system 40, to platform 16, and to clamp mechanisms 28. Controller 48 controls the movement of platform 16 for take-off and landing and controls clamp mechanisms 28 for releasably coupling aircraft 14 to platform 16.

For take-off, in this example, controller 48 is provided with the take-off velocity for aircraft 14 positioned on platform 16. Controller 48 commands clamp mechanisms 28 to couple aircraft 14 to platform 16. Clamp mechanisms 28 communicate to controller 48 that aircraft 14 is secured to platform 16. Controller 48 provides communications to electrical power supply 46 to provide, in this example, sufficient electrical energy to pair of rails 42 for platform 16 to attain take-off velocity for aircraft 14. At the time for take-off, controller 48 instructs clamp mechanisms 28 to decouple from struts 30 of aircraft 14 releasing aircraft 14 to lift off of platform 16. With aircraft 14 lifting off of platform 16, in this example, a weight sensor positioned on platform 16 senses aircraft 14 is no longer positioned on platform 16. The weight sensor sends the data to controller 48. Controller 48, in response to receiving this data from the weight sensor, sends a communication to electrical power supply 46 to reduce supply of, in this example, electrical power to pair of rails 42 to decelerate platform 16. If sufficient length of recess 17 is not available to completely stop platform 16, first barrier 24 or second barrier 25 will absorb impact of platform 16 and stop platform 16 without imparting damage to platform 16.

With respect to landing of aircraft 14 onto platform 16, controller 48 receives data regarding position, velocity, and orientation of incoming aircraft 14. Controller 48 provides commands to electrical power supply 46 to provide the appropriate electrical power to pair of rails 42 for platform 16 to attain a matching velocity of incoming landing aircraft 14. Additionally, in this example, controller 48 will receive data from sensors, for example, positioned on aircraft 14 regarding the pitch, yaw, and roll of aircraft 14. In turn, controller 48 sends hydraulic or electrical actuators positioned on platform 16 instructions to move top surface 26. Top surface 26 can be moved to match the pitch, yaw, and roll of aircraft 14 in order to optimally receive aircraft 14 onto platform 16. Actuators, as will be discussed herein, are used to move top surface 26 of platform 16. Controller 48 receives data regarding orientation of aircraft 14 and controller 48, in turn, instructs the actuators to move top surface 26 to match the orientation of aircraft 14.

In this example, platform 16 has the weight sensor, which detects engagement of landing gear of aircraft 14 onto platform 16. The weight sensor communicates weight data to controller 48. In return, controller 48 commands clamp mechanisms 28 to couple to struts 30. Clamp mechanism 28 provides controller 48 with a communication, which confirms aircraft 14 has been coupled to platform 16. At that time, controller 48 instructs electrical power supply 46 to reduce power supplied to pair of rails 42. With the reduction of power provided to pair of rails 42, platform 16 decelerates, and platform 16 and aircraft 14 are brought to a stop. With platform 16 and aircraft 14 stopped, controller 48 instructs electrical power supply 46 to provide electrical power to pair of rails 42 to move platform 16, in this example, to first end portion 19 of recess 17. With aircraft 14 at first end portion 19 and platform 16 has stopped, controller 48 instructs clamp mechanism 28 to uncouple from strut 30 and wheel blocks 32 to move to a non-blocking position. The operation of controller 48 will be further discussed below with respect to moving platform 16 and operating clamp mechanisms 28 in facilitating take-off and landing of aircraft 14.

In referring to FIGS. 1 and 2, runway system 12 for controlling movement of an aircraft 14 is shown. Recess 17 is positioned adjacent to surface 18 of taxiway 20 and below taxiway 20. First barrier 24, as discussed above, is positioned at first end portion 19 of recess 17 and, in this example, second barrier 25 is positioned at second end portion 27 of recess 17. First barrier 24 is used to assist deceleration of platform 16 after aircraft 14 has taken off from platform 16 with platform moving toward first end portion 19. With the direction of take-off of aircraft 14 being toward second end portion 27, second barrier 25 is used to slow down and stop platform 16. Positioning first barrier 24 at first end portion 19 and second barrier 25 at second end portion 27, provides airport operations versatility in direction of take-off of aircraft 14.

Runway system 12 further includes conveying system 40. Conveying system 40 includes at least one rail, in this example, pair of rails 42, positioned to extend along a length and along floor 44 of recess 17. In addition, conveying system 40 includes electrical power supply 46, which is electrically connected to pair of rails 42. Platform 16 is positioned within recess 17 and above floor 44 and pair of rails 42. Platform 16 has magnets, which magnetically couple platform 16 to pair of rails 42 and causes platform 16 to levitate over pair of rails 42 when electrical power is provided to pair of rails 42. The same electrical power provided to pair of rails 42 provides linear movement to platform 16 due to electromagnetic force exerted onto the magnets positioned on platform 16. Platform 16 is also coupled to pair of rails 42 with magnets and/or wheels engaging opposing lateral sides of each rail of pair of rails 42, or other like structure for maintaining platform 16 aligned with pair of rails 42. As discussed earlier, controller 48 is connected to electrical power supply 46 and controls the amount of electrical energy provided to pair of rails 42 to accelerate or decelerate platform 16. The amount of and direction of electrical energy provided pair of rails 42 controls movement of platform 16. Controller 48, as mentioned above, controls clamp mechanisms 28 and acceleration of platform 16 for take-off. Further, controller 48 controls acceleration and position of platform 16, top surface 26 orientation, and clamp mechanisms 28 for landing of aircraft 14.

Runway system 12 also includes platform 16 positioned within recess 17 with top surface 26 of platform 16 positioned substantially aligned with surface 18 of taxiway 20. In this example, taxiway 20 includes support surface 22, which is positioned over first barrier 24 and second barrier 25. Substantial alignment of taxiway 20, support surface 22, and top surface 26 of platform 16 provides a smooth transition of aircraft 14 taxiing from taxiway 20 onto to platform 16 and from platform 16 onto taxiway 20 at both first end portion 19 and second end portion 27 of recess 17.

Figure 9:
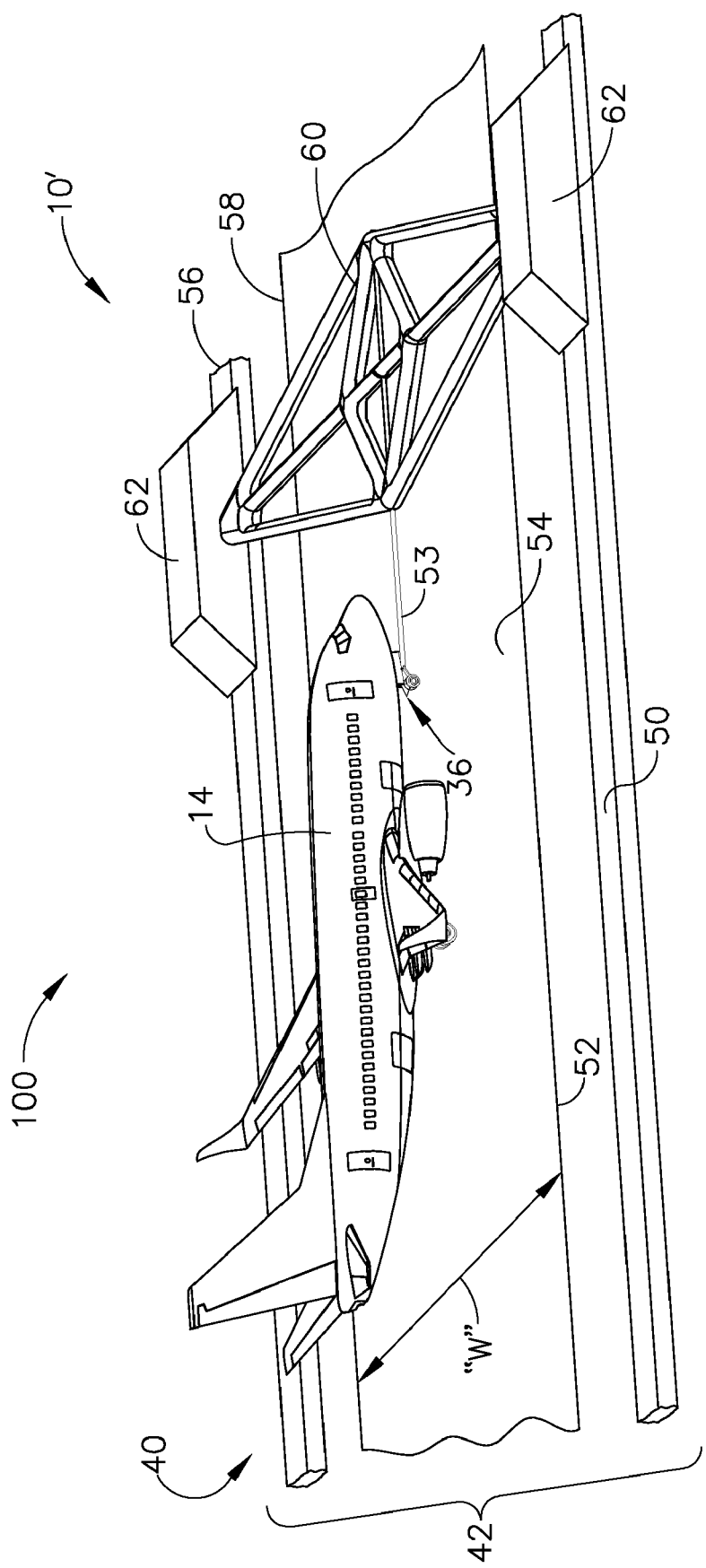
FIG. 9 is a schematic perspective view of a second embodiment of a system for controlling accelerating movement of an aircraft.

A second example of system 10' for controlling movement of an aircraft 14 is shown in FIGS. 3, 6 and 9. An example of this second embodiment, includes a frame 60, as seen in FIG. 9, positioned above and extending across a width "W" of runway 54. Platform 16 is seen in FIG. 3. Frame 60 is coupled to platform 16 with attachment member 53 (e.g. a tug), as seen in FIG. 9, being used to secure to front landing gear 36. Conveying system 40, as seen in FIG. 9, includes first rail 50 positioned on first side 52 of runway 54 and second rail 56 positioned on second side 58 of runway 54. First rail 50 and second rail 56 are electrically connected to electrical power supply 46, as shown in FIG. 1. Conveying system 40 further includes wheels 64 coupled to platform 16 so as to rotate relative to platform 16. Frame 60 is coupled with coupling ends 62 to first rail 50 and second rail 56 of conveying system 40. Coupling ends 62 include magnets that cause frame 60 to levitate with respect to first rail 50 and second rail 56, or otherwise referred to as pair of rails 42, with electrical power provided to first rail 50 and second rail 56. Frame 60 is electromagnetically driven linearly along first rail 50 and second rail 56 and runway 54 with electromagnetic force exerted onto the magnets positioned on coupling ends 62. Additionally, coupling ends 62 are coupled to first rail 50 and second rail 56 with magnets and/or wheels engaging opposing lateral sides of each rail of first rail 50 and second rail 56, or other like structure for maintaining coupling ends 62 aligned with first rail 50 and second rail 56. The linear movement imparted to frame 60 results in platform 16 rolling along runway 54 for both take-off and landing of aircraft 14.

In this second example of system 10', platform 16 utilizes clamp mechanism 28, as shown in FIGS. 6-8, to releasably couple struts 30 of aircraft 14 to platform 16, which will be discussed in more detail. In this example, platform 16 also utilizes wheel blocks 32 to block wheels 34 and 35 from rolling with respect to top surface 26, as seen in FIG. 3. In this example, controller 48 communicates with clamp mechanisms 28 much like that described above for the first embodiment. Clamp mechanism 28 is instructed by controller 48 to couple to struts 30 of aircraft 14 to platform 16 for accelerating platform 16 for take-off of aircraft 14 and also communicates to clamp mechanisms 28 to uncouple from struts 30 at time of take-off of aircraft 14 from platform 16. In this embodiment, controller 48 controls take-off as described above for the first embodiment. A velocity sensor of platform 16 is used in both examples of system 10 and system 10', to inform controller 48 of the velocity of platform 16. When take-off velocity as a take-off condition is attained, in this example, controller 48 instructs clamp mechanisms 28 to uncouple from struts 30. Release of struts 30 permit aircraft 14 to depart from platform 16. Other take-off conditions are described below.

When landing aircraft 14, with this second example of system 10', platform 16 is controlled by controller 48 as described in the first example of system 10. An additional control by controller 48 is present in this second example of system 10'. Attachment member 53 is moveable along frame 60 in a direction of width "W" of runway 54. Controller 48 receives position data of aircraft 14 that indicates aircraft 14 is positioned more on one side of center of runway 54 than on another side of center of runway 54. Controller 48 commands frame 60 to move attachment member 53 along frame 60 in the direction of the width "W" of runway 54. Controller 48 aligns platform 16 to receive incoming landing aircraft 14. As a result, controller 48, in this second example, controls the lateral movement of platform 16 with respect to runway 54. Controller 48 controls, as in the first example, conveying system 40, platform 16, and clamp mechanisms 28 so as to accommodate accelerating aircraft 14 for take-off and decelerating aircraft 14 for landing. After aircraft 14 has been brought to a stop, platform 16 is towed by frame 60 to a recess, similar to recess 17 shown in FIG. 1, however this recess will have a ramp providing platform 16 access to the recess. Attachment member 53 is disconnected from platform 16, and clamp mechanism 28 uncouples aircraft 14 from platform 16. Aircraft 14 taxis off of top surface 26 of platform 16 onto taxiway 20.

Figure 4:
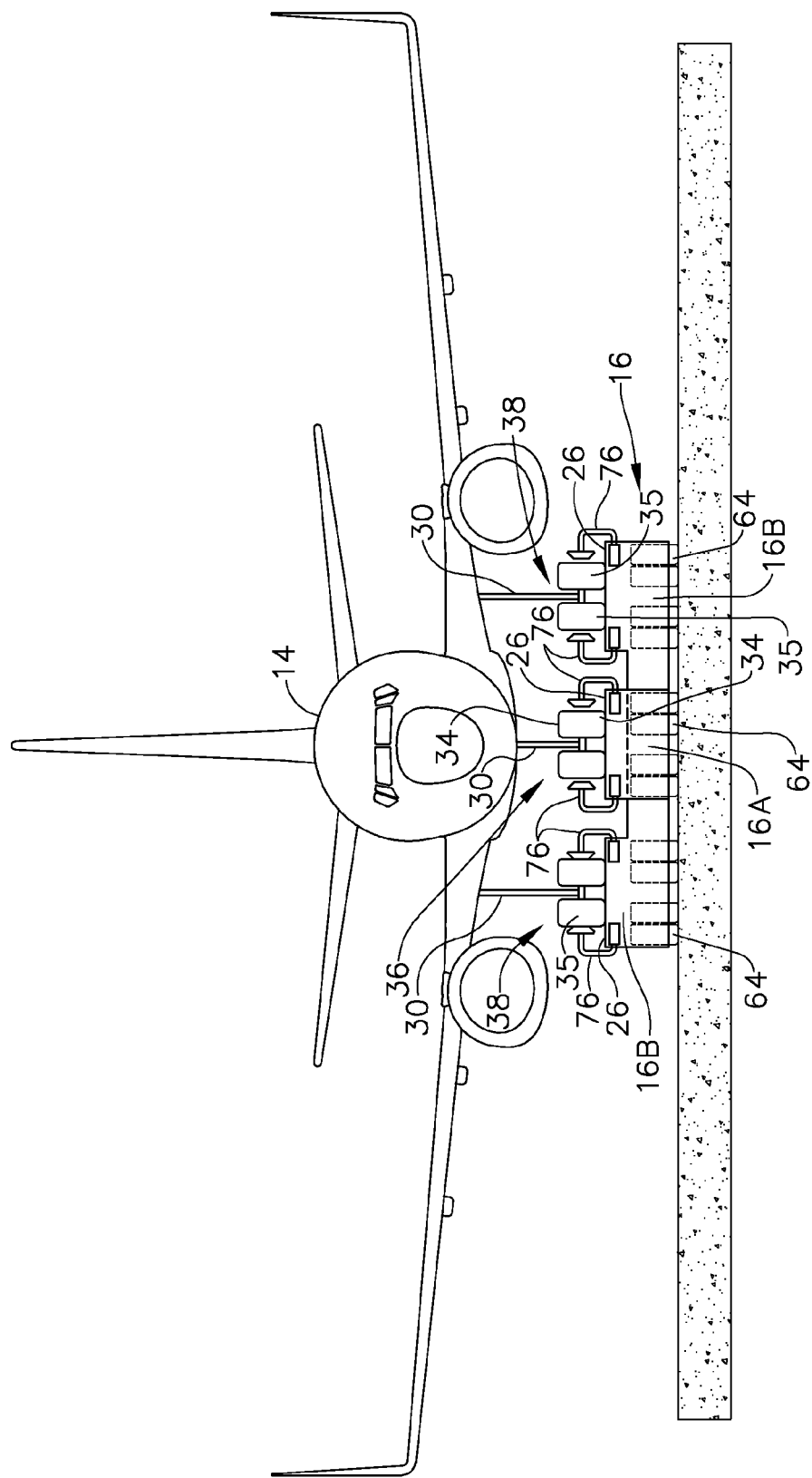
FIG. 4 is a schematic front elevation view of a second example of a platform of the system for controlling movement of an aircraft.
Figure 5:
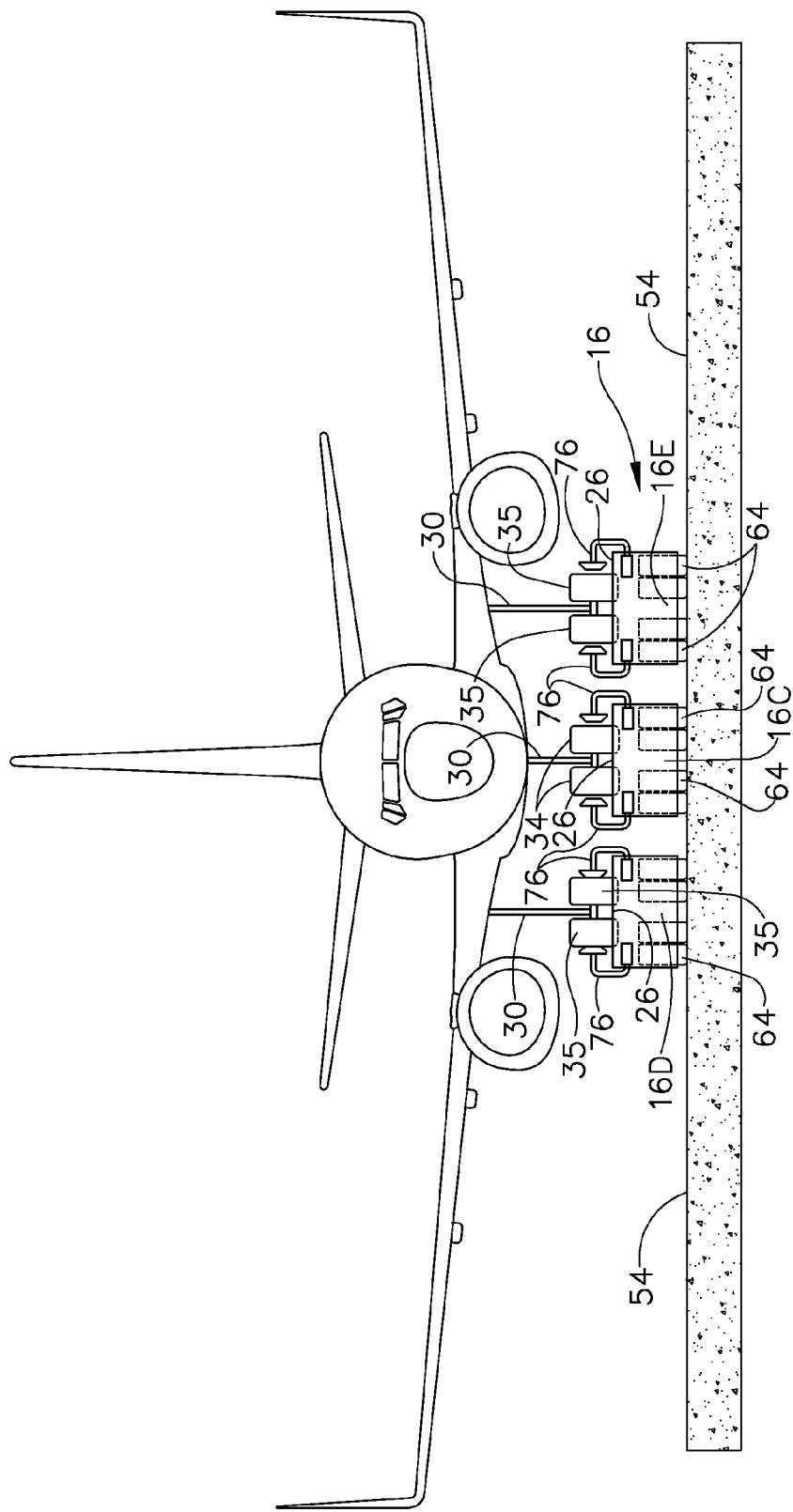
FIG. 5 is a schematic front elevation view of a third example of a platform of the system for controlling movement of an aircraft.

As seen in FIG. 3, platform 16 is shown as a single component. Other examples of platform 16 include platform 16 including two spaced apart components or platform 16A and platform 16B, as seen in FIG. 4. Another example of platform 16 includes three components or platform 16C, platform 16D, and platform 16E that are spaced apart from one another, as shown in FIG. 5. These examples of platform 16 can be used in either of the two described examples for system 10 and system 10' for controlling movement of an aircraft 14. Much like controller 48 controls platform 16 as a single platform 16, controller 48 controls the movement, position, and orientation of these other examples of platform 16 having two or three components. Controller 48 is coupled to conveying system 40, platform 16 with two or three components, and clamp mechanisms 28 of each component. Thus, platform 16 with one, two, or three components will operate to accelerate aircraft 14 secured to platform 16 for aircraft 14 to take-off. Platform 16 with one, two, or three components will operate to decelerate aircraft 14 secured to platform 16 for aircraft 14 to land. Clamp mechanisms 28 will be similarly controlled by controller 48 to releasably couple struts 30 and to uncouple struts 30 as commanded, regardless of the number of components of platform 16 that are employed.

In referring to FIGS. 3-5, platform 16 is shown with different numbers of components. In FIG. 3, platform 16 comprises a single component or platform 16. In FIG. 4, platform 16 includes two spaced apart components or platform 16A and platform 16B, wherein platform 16A supports front landing gear 36 and platform 16B supports rear landing gear 38. In FIG. 5, platform 16 includes three spaced apart platforms such as platform 16C, platform 16D, and platform 16E. Platform 16C supports front landing gear 36, and platform 16D and platform 16E support rear landing gear 38.

Regardless of the number of components of platform 16 used, whether a single component platform 16, two components or platform 16A and platform 16B, or three components or platform 16C, platform 16D, and platform 16E, all configurations of platform 16 support aircraft 14. Additionally, all components of platform 16 have clamp mechanisms 28, as shown in FIGS. 6-8, used to releasably couple aircraft 14 to platform 16. Whether platform 16 comprises one, two or three components, each of these components of platform 16 will be controlled by controller 48 to accelerate aircraft 14 for take-off and to receive and decelerate aircraft 14 for landing, as is described herein for single platform 16.

Another example of clamp mechanism 28 is shown in FIGS. 4 and 5. In such an example, opposing arms 76 are secured to platform 16. In FIG. 4, hydraulic or electric powered opposing arms 76 are secured to platform 16A and are positioned on opposing lateral sides of wheels 34. Wheels 34 are secured to strut 30 of front landing gear 36. Similarly, opposing arms 76 are secured to platform 16B positioned on lateral opposing sides of wheels 35. Wheels 35 are positioned on each strut 30 of rear landing gear 38. With aircraft 14 engaging platform 16A and platform 16B opposing arms 76 clamp into wheel wells of wheels 34 and 35 and secure front landing gear 36 and rear landing gear 38 to platform 16A and platform 16B, respectively. At time of take-off or at time aircraft 14 is to taxi off of platform 16A and platform 16B after landing, opposing arms 76 are unclamped and removed from wheel wells of wheels 34 and 35. Opposing arms 76, when not in use, are rotated downwardly relative to top surface 26. Opposing arms 76 are raised and re-clamped to wheels 34 and 35 with aircraft 14 positioned on platform 16A and platform 16B preparing for platform 16A and platform 16B to impart acceleration to aircraft 14 for take-off. Opposing arms 76 are raised and clamped to wheels 34 and 35, coupling aircraft 14 to platform 16A and platform 16B when landing.

In FIG. 5, opposing arms 76 are similarly used for clamping wheel wells of wheels 34 of front landing gear 36 and for wheel wells of wheels 35 of rear landing gear 38 as described above for two components of platform 16A and 16B. Instead of opposing arms 76 being secured to platform 16B for rear landing gear 38, opposing arms 76 in FIG. 5 are positioned on each of platform 16D and platform 16E for coupling and decoupling from rear landing gear 38.

In referring to FIGS. 1 and 3, a front portion 29 of top surface 26 of platform 16 is positioned in an angular relationship relative to a surface such as, runway 54 or floor 44 of recess, on which platform 16 is positioned. This angular position of top surface 26 is positioned at a location on platform 16 such that front landing gear 36 of aircraft 14 is positioned on this raised portion of top surface 26. Nose 78 of aircraft 14 is positioned in a slightly upward position relative to runway 54 or floor 44. This configuration of nose 78 provides aircraft 14 more lift and a more proper take-off position for take-off from platform 16. This angular orientation of top surface 26 can also be positioned on platform 16A and platform 16C, which support front landing gear 36.

An example of conveying system 40, for the first and second example of system 10 and system 10' for controlling movement of an aircraft, included pair of rails 42 positioned either in recess 17 or outside of and on either side of runway 54 for use with electromagnetic power. Another example of conveying system 40 can be used with any configuration of platform 16, whether including one, two, or three components. Each component of platform 16 can also be self-propelled. Conveying system 40 includes each component carrying its own propulsion driving mechanism coupled to the component, such as a combustion engine or electric motor or the like providing power to wheels 64. Wheels 64, as seen in FIGS. 3-6, are secured to each of these platforms for rotation relative to the platform to permit platform 16, whether a single, double, or triple component platform 16, to roll along runway 54. Controller 48 controls the speed and direction of each platform component for take-off acceleration and for catching aircraft 14 and deceleration. As discussed above, controller 48 will control the conveying system 40, platform 16, (including its speed, position, and orientation) and clamp mechanism 28 to facilitate take-off and landings with the various configurations of platform 16.

In referring to FIGS. 6-8, clamp mechanism 28 is shown coupled to platform 16. In FIG. 6, clamp mechanism 28 is shown coupled to strut 30 of rear landing gear 38. Clamp mechanism 28 includes an arm 80 rotatably connected to platform 16 with a pivot 82. Hydraulic actuator 84, in this example, is rotatably secured to one end 86 of arm 80 with pivot 88. In other examples, electrical actuators and the like may be used. With hydraulic actuator 84 in a retracted position, a lead end portion 90 of arm 80 is in an extended position engaging strut 30. Lead end portion 90 includes opposing fingers 92, as seen in FIG. 7. Opposing fingers 92 are pivotally mounted to lead end portion 90 with a pivot 94. Weight sensors positioned on platform 16 or other sensors such as visual sensors communicate to controller 48 that aircraft 14 has engaged top surface 26 of platform 16. In turn, controller 48 instructs clamp mechanism 28 to rise and opposing fingers 92 to engage strut 30. Opposing fingers 92 close around strut 30 and couple strut 30 to platform 16. With clamp mechanism 28 in an uncoupled position, as shown in dashed lines, hydraulic actuator 84 is in an extended position, and lead end portion 90 is in a retracted position from strut 30. Similarly, clamp mechanism 28, as shown in FIG. 8, operates to couple and uncouple strut 30 of front landing gear 36.

Controller 48 instructs clamp mechanisms 28 to have hydraulic actuator 84 in an extended position with platform 16 unsecured from aircraft 14. However, with aircraft 14 on platform 16 for purposes of receiving acceleration from platform 16 for take-off, controller 48 instructs hydraulic actuator 84 to move to a retracted position and opposing fingers 92 to lock onto strut 30. With a sensor on platform 16 sensing platform 16 has reached take-off velocity, sensor sends data of reaching take-off velocity to controller 48. Controller 48 then instructs hydraulic actuator 84 to move to an extended position, decoupling fingers 92 of clamp mechanism 28 from strut 30 to permit aircraft 14 to take-off from platform 16. Alternatively, the sensor that detects the take-off velocity has been attained for aircraft 14 and communicates the data to controller 48 will not, by itself, indicate a take-off condition has been attained. However, in this example, in order for controller 48 to send a command to hydraulic actuator 84 to move to an extended position and decouple clamp mechanism 28 from strut 30, controller 48 also, in addition, receives an instruction from another sensor on clamp mechanism 28. This another sensor on clamp mechanism 28 senses a lift force being exerted against clamp mechanism 28 by aircraft 14. With a lift force received by this another sensor, the another sensor communicates that data to controller 48. Thus, the take-off condition, in this example, includes both that take-off velocity has been reached and that a lift force has been exerted by aircraft 14 prior to controller 48 commanding hydraulic actuator 84 to move to an extended position uncoupling clamp mechanism 28 from strut 30.

With respect to landing aircraft 14 onto platform 16, a sensor positioned on platform 16, in this example, senses weight being exerted onto platform 16 from wheels 34 and 35 of aircraft 14. With the weight data sent to controller 48, controller 48 instructs hydraulic actuator 84 to move to a retracted position to enable clamp mechanism 28 to couple to strut 30 to releasably couple aircraft 14 to platform 16. With aircraft 14 secured to platform 16, controller 48 instructs conveying system 40 to decelerate platform 16 bringing aircraft 14 to a stop. With aircraft 14 stopped and in position to taxi off of platform 16, controller 48 sends an instruction to hydraulic actuator 84 to move to an extended position to decouple aircraft 14 from platform 16.

In referring to FIG. 9, a second embodiment of a system 100 for controlling movement of an aircraft 14 is shown. System 100, as will be described below, uses frame 60 to accelerate aircraft 14 for take-off, without aircraft 14 positioned on platform 16. In contrast, the second example of system 10' also uses frame 60, as seen in FIG. 9 and described above, however, instead of coupling frame 60 directly to aircraft 14, frame 60 is coupled to platform 16. Platform 16 provides support, in that example, to aircraft 14 for take-off and landing of aircraft 14.

System 100 is used to accelerate aircraft 14 along runway 54 to facilitate take-off for aircraft 14. In this example, frame 60 is positioned above runway 54 and extends across a width "W" of runway 54. Conveying system 40 is positioned on opposing sides of the runway 54 and includes pair of rails 42. Conveying system 40 includes first rail 50 positioned on first side 52 of runway 54 and second rail 56 positioned on second side 58 of runway 54. Conveying system 40 further includes electrical power supply 46, as seen in FIG. 1, which is electrically connected to first rail 50 and second rail 56. First rail 50 and second rail 56 extend in a direction along a length of runway 54, and frame 60 is coupled to the first rail 50 and second rail 56 with coupling ends 62, as described above. With electrical energy supplied to first rail 50 and second rail 56, electromagnetic force drives coupling ends 62 and frame 60, accelerating frame 60 along first rail 50 and second rail 56 and runway 54, as also described above. Frame 60 is releasably coupled with attachment member 53 releasably secured to at least one landing gear, in this example, front landing gear 36 of aircraft 14. Attachment member 53, in this example, is a tug, which releasably couples to strut 30 of front landing gear 36. Other power supplies for conveying system 40 can be selected, such as, steam, electrical motor, and internal combustion motor.

Attachment member 53 is secured to frame 60 and releasably coupled to strut 30 of front landing gear 36. With attachment member 53 coupled to strut 30 of aircraft 14, controller 48 instructs electrical power supply 46 of conveying system 40 to provide electrical power to first rail 50 and second rail 56. With first rail 50 and second rail 56 powered, electromagnetic linear force is applied to frame 60 to accelerate frame 60 and aircraft 14. Controller 48 instructs electrical power supply 46 to supply power for frame 60 to attain take-off velocity for aircraft 14. Attachment member 53 is uncoupled from strut 30 at the time of take-off for aircraft 14, as clamp mechanism 28, described above, is uncoupled from strut 30 at the time of take-off. Controller 48 instructs attachment member 53 to release strut 30 of aircraft 14 when a sensor on frame 60 informs controller 48 that aircraft 14 attained a take-off velocity. In the alternative, controller 48 instructs attachment member 53 to uncouple from strut 30 when information from a sensor on frame 60 indicates that aircraft 14 has attained take-off velocity and that another sensor on attachment member 53 indicates that aircraft 14 has exerted a lift force onto attachment member 53.

Figure 10:
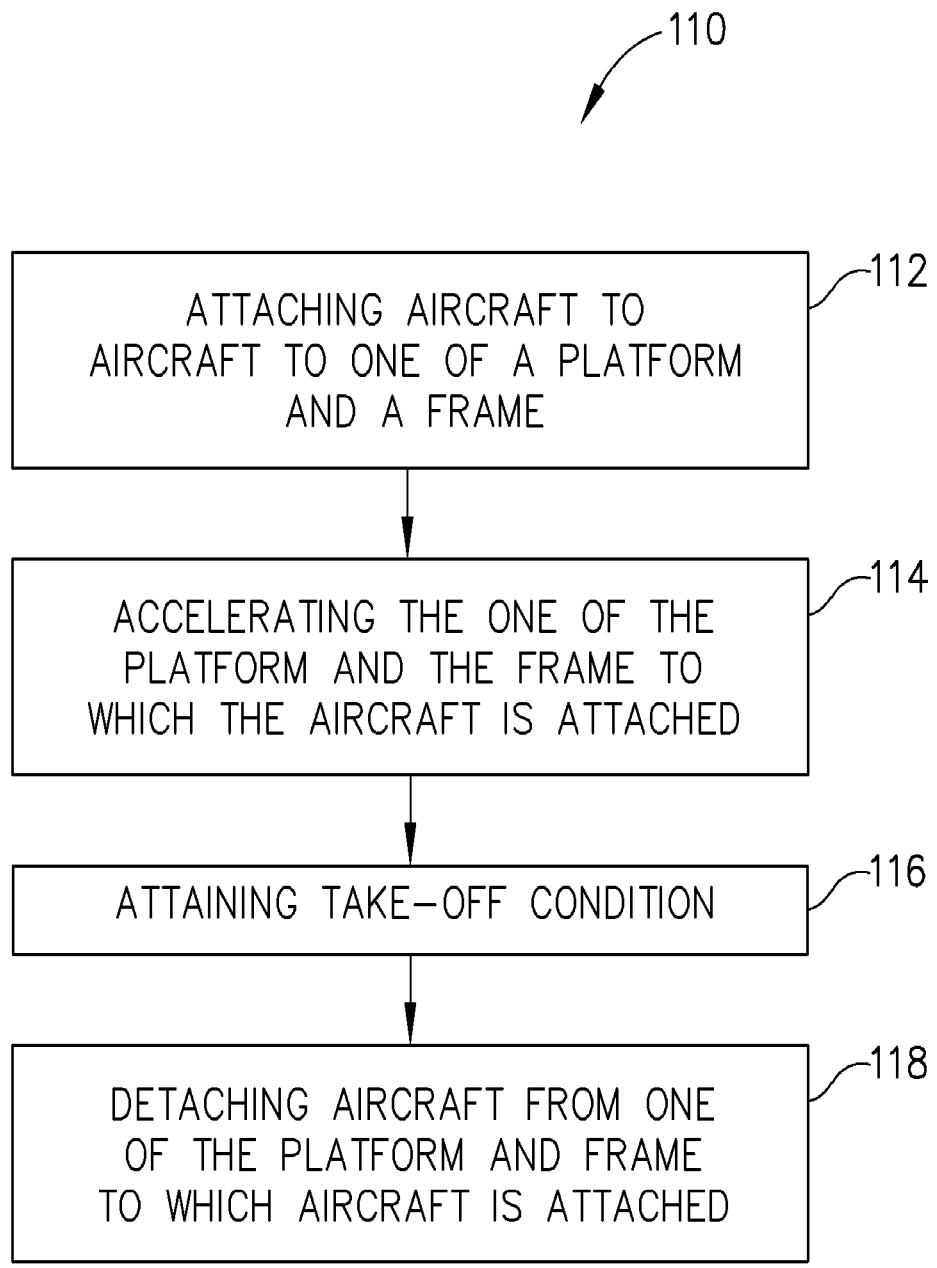
FIG. 10 is a flow chart of a method for take-off of an aircraft.

In referring to FIG. 10, a method 110 for accelerating an aircraft for take-off is shown. Method 110 for accelerating an aircraft for take-off includes the step 112 of attaching aircraft 14 to one of onto a platform 16 and to a frame 60, wherein frame 60 is positioned above runway 54 and extends across a width of runway 54. As described above, aircraft 14 is positioned on platform 16 and is releasably coupled to platform 16 with clamp mechanism 28. Alternatively, in a second embodiment of system 100, aircraft 14 is releasably secured to frame 60 positioned above runway 54 and extending across a width "W" of runway 54.

Method 110 includes step 114 of accelerating the one of platform 16 and frame 60 to which aircraft 14 is releasably secured. Controller 48 is provided with the take-off velocity for aircraft 14. Controller 48 connected to electrical power supply 46 instructs electrical power supply 46 to provide sufficient electrical power, in this example, to pair of rails 42. Platform 16, in one example of the first embodiment of system 10, is magnetically coupled to pair of rails 42, and in a second example of system 10' and in the second embodiment of system 100, frame 60 is magnetically coupled to pair of rails 42. The electrical power supplied to rails 42, as instructed by controller 48, accelerates platform 16 or frame 60 to the take-off velocity for aircraft 14.

Method 110 further includes step 116 of attaining a take-off condition. Take-off condition can include platform 16 or frame 60 attaining the take-off velocity of aircraft 14. Attaining the take-off velocity is detected by a sensor that detects the velocity of platform 16 or frame 60 and communicates the data to controller 48. Alternatively, take-off condition can include meeting two conditions, first, take-off velocity for aircraft 14 has been attained, as described above, and second, that a lift force has been exerted by aircraft 14 onto clamp mechanism 28, in the above described examples of the first embodiment of system 10 or onto attachment member 53 in the above described second embodiment of system 100. The lift force can be sensed by a strain sensor positioned on clamp mechanism 28 positioned on platform 16 for the first embodiment of system 10, or strain sensor can be positioned on attachment member 53 for the second embodiment of system 100. This strain sensor communicates the lift force to controller 48, and the velocity sensor reports velocity of platform 16 or frame 60 to controller 48.

Method 110 additionally includes step 118 of detaching aircraft 14 from one of platform 16 and frame 60 to which aircraft 14 is attached. Detaching aircraft 14 from platform 16 occurs when controller 48 has received the data that the take-off condition has been attained. Controller 48 then sends a command to clamp mechanism 28 to uncouple clamp mechanism 28 from strut 30. In the instance of the second embodiment of system 100, controller 48 sends a command to attachment member 53 to uncouple from strut 30 of aircraft 14.

With aircraft 14 detached from platform 16, aircraft 14 climbs away from platform 16. In this example, with a weight sensor on platform 16 sensing aircraft 14 has lifted off of platform 16, a signal is sent to controller 48 from this sensor. Controller 48 receives the signal that aircraft 14 has taken-off and sends a communication to electrical power supply 46 to reduce electrical power being provided to pair of rails 42. With the reduction of electrical power, in this example, provided to rails 42, platform 16 decelerates. With respect to frame 60, once aircraft 14 is detached from frame 60, a sensor on attachment member 53 senses aircraft 14 has ascended from runway 54. This sensor sends a signal to controller 48 that aircraft 14 has taken-off. Controller 48, in return, communicates to electrical power supply 46 to reduce electrical power to pair of rails 42. With the reduction of power to rails 42, frame 60 decelerates. As mentioned above, other power sources for conveying system can be selected, such as steam, electric motor, and internal combustion engine.

Figure 11:
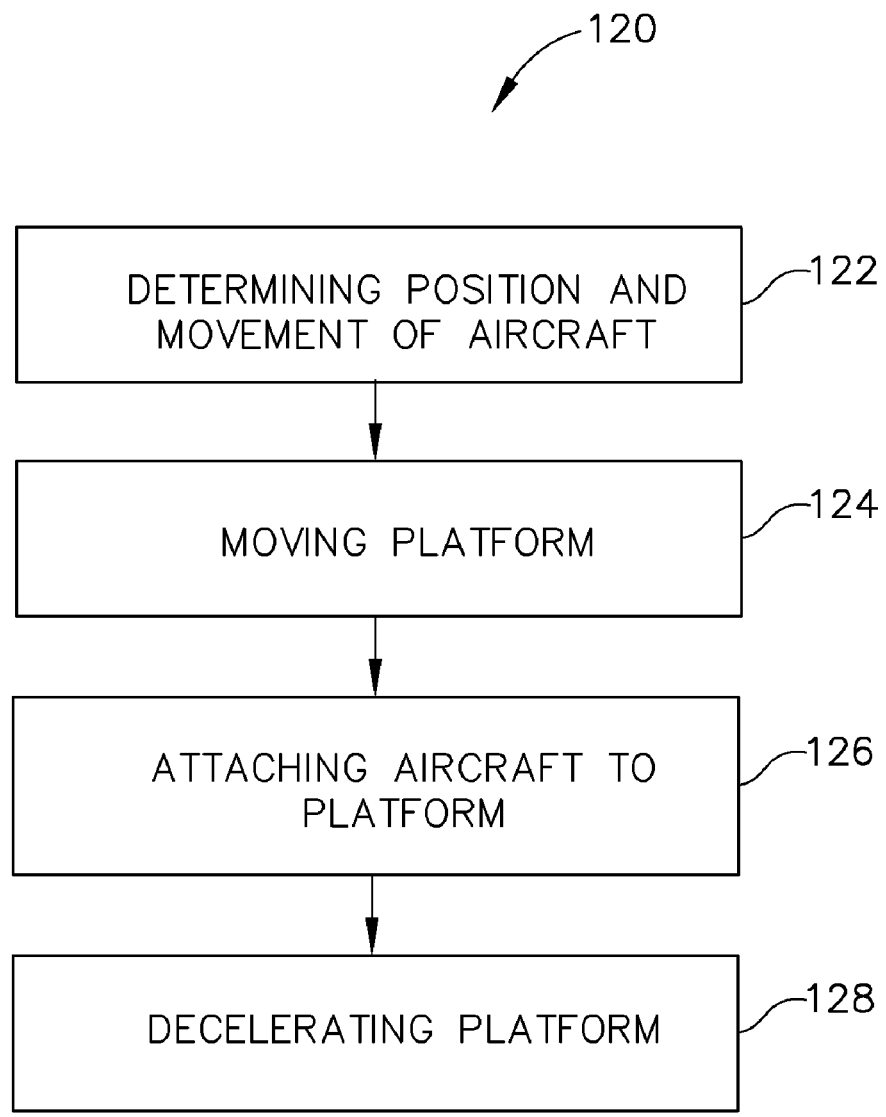
FIG. 11 is a flow chart of a method for landing of an aircraft.

In referring to FIG. 11, a method 120 for decelerating an aircraft for landing is shown. Method 120 for decelerating aircraft 14 for landing includes step 122 of determining the position and movement of an incoming aircraft 14 relative to platform 16. As aircraft 14 approaches an airfield and makes preparations for landing, communications link with the controller 48 of conveying system 40 for platform 16 is established. Controller 48 utilizes aircraft-supplied positional data, including GPS, satellite triangulation, sensors at the airport, such as airfield radar or LIDAR, to establish the plane's position and movement relative to platform 16. Aircraft 14 self-reported position, attitude, and altitude are also communicated to controller 48. In addition, aircraft 14 make and model is also communicated to controller 48 to provide controller 48 optimal catching conditions such as standard wheel size, landing gear catchment locations, etc.

At this time, air traffic control verifies landing auto-catch conditions (i.e., clear to land). Conveying system 40 self-monitoring conditions are reported to controller 48, and this status is displayed to air traffic control. Air traffic control approves the auto-catch landing on the appropriate runway 54. Controller 48 maintains headings and speed for all nearby airborne aircraft should a landing pilot desire to override air traffic control's disapproval of a landing. In either case, the pilot must either manually confirm that an auto-catch landing is desired, or have the autopilot set to auto-catch and the autopilot computer will relay the auto-catch approval.

Controller 48 maintains a positional model with the instantaneous platform 16 location, orientation, and altitude with respect to the runway 54, and the landing aircraft 14. As aircraft 14 approaches approach strobes of runway 54, controller 48 refines an initial speed estimate for the landing aircraft 14 as the target speed for platform 16.

Method 120 for decelerating an aircraft for landing includes step 124 of moving platform 16. Movement of platform 16 is to match movement of landing aircraft 14. As aircraft 14 passes over the runway 54 threshold, or beginning of runway 54, controller 48 commands conveying system 40 to launch platform 16 forward. Platform 16 is accelerated by conveying system 40 until platform 16 matches speed of aircraft 14. With platform 16 in proximity to aircraft 14, sensors on platform sense position of wheels 34 and 35 on front landing gear 36 and rear landing gear 38, respectively. This data is obtained from onboard sensors that include a combination of video feeds, LIDAR, or other ranging data. This data is transmitted to controller 48. Platform 16 sensors may also receive data from transponders located at key points on aircraft 14 to establish auto-catch or landing conditions. Controller 48 assimilates all the data with preference for the data directly reported from the sensors on platform 16, which receives data from aircraft 14 transponders. As aircraft 14 descends, controller 48 makes continuous speed adjustments to platform 16 to match aircraft 14 with commands to electrical power supply 46. Additionally, controller 48 makes adjustments to top surface 26 of platform 16 to match pitch, yaw, and roll orientation of wheels 34 and 35 of aircraft 14, as described below.

Method 120 for decelerating an aircraft for landing includes step 126 of attaching incoming aircraft 14 to the platform 16. Aircraft 14 descends onto platform 16 and, once contact position is reached, which is typically sensed by a weight sensor, weight sensor communicates this occurrence to controller 48. Controller 48 sends a command to clamp mechanism 28 to rapidly couple struts 30 of front landing gear 36 and rear landing gear 38, respectively. Once struts 30 have been coupled, clamp mechanism 28 reports this data to controller 48.

Method 120 for decelerating an aircraft for landing includes step 128 of decelerating platform 16. Controller 48 commands conveying system 40 to provide less electrical power, in this example, to pair of rails 42, which begins to decelerate platform 16 and aircraft 14 attached to platform 16. An optimal rate of deceleration is employed for passenger comfort. The distance remaining to the end of runway 54 and current speed of platform 16 is also taken into consideration for rate of deceleration. Controller 48 reports the coupled condition of aircraft 14 with respect to platform 16 to air traffic control and this coupled state is reported to the landing aircraft 14. This communication is made, in this example, automatically to landing aircraft 14 autopilot computer. The pilot or autopilot computer responds by assisting the deceleration using aircraft 14 control surfaces and engine speed adjustments or reverse thrusting. Should top surface 26 of platform 16 be raised during this landing process, the hydraulic or electric actuators that have raised top surface 26 are used to descend top surface 26 during deceleration of platform 16 in preparation for reaching an unloading position.

Method 120 for decelerating an aircraft for landing further includes the step of detecting the orientation of wheels 34, 35 of aircraft 14 and adjusting platform 16 to match the orientation of wheels 34, 35. As mentioned above, with platform 16 in proximity to aircraft 14, sensors on platform sense position of wheels 34 and 35 positioned on front landing gear 36 and rear landing gear 38, respectively. Sensors on platform 16 can include a combination of video feeds, LIDAR, or other ranging sensors. The data from these sensors is transmitted to controller 48. Platform 16 sensors may also receive data from transponders located at key points on aircraft 14 to establish auto-catch or landing conditions. Controller 48 assimilates all of the data, with preference for the data directly reported by from the sensors on platform 16, which receives data from aircraft 14 transponders. This data includes the pitch, yaw and roll of aircraft 14. The pitch, yaw, and roll data is transmitted to controller 48, and controller 48 sends commands to hydraulic or electric actuators positioned under top surface 26 of platform 16. Actuators raise top surface 26 to engage wheels 34, 35 of aircraft 14 and also orient top surface 26 to match the pitch, yaw, and roll of aircraft 14. As aircraft 14 descends onto top surface 26 of platform 16, controller 48 makes continuous adjustments to top surface 26 until contact position is reached by aircraft 14.

At the unloading position, platform 16 descends below runway 54 level until aircraft 14 wheels 34, 35 are level with the paved surface of runway 54. Platform 16 comes to a complete stop. Automatically, or at the pilot's command, in this example, clamp mechanism 28 decouples from struts 30. Clamp mechanism 28 retracts, and the pilot disengages aircraft parking brakes, applies throttle, and taxis aircraft 14 to the arrival gate. Controller 48 verifies aircraft 14 has disengaged from platform 16. In this example, controller 48 directs platform 16 to return to a start position, either by traversing pair of rails 42 in reverse, or continuing on an above or below-ground rail loop built for the purpose.

Clause 1 A method for accelerating an aircraft for take-off, the method including the steps of attaching an aircraft to one of onto a platform and a frame, the frame positioned above a runway and extending across a width of the runway and accelerating the one of the platform and the frame, to which the aircraft is attached, to attain a take-off condition of the aircraft. Also are included the step of detaching the aircraft from the one of the platform and the frame when the take-off condition is attained.

Clause 2 A method for accelerating an aircraft for take-off, the method including the steps of attaching an aircraft to one of onto a platform and a frame, the frame positioned above a runway and extending across a width of the runway and accelerating the one of the platform and the frame, to which the aircraft is attached, to attain a take-off condition of the aircraft. Also are included the step of detaching the aircraft from the one of the platform and the frame when the take-off condition is attained. The step of detaching occurs when one of the platform and the frame reaches a velocity enabling the aircraft to take-off or reach a velocity enabling the aircraft to take-off and the aircraft exerts a lift force.

Clause 3 A method for accelerating an aircraft for take-off, the method including the steps of attaching an aircraft to one of onto a platform and a frame, the frame positioned above a runway and extending across a width of the runway and accelerating the one of the platform and the frame, to which the aircraft is attached, to attain a take-off condition of the aircraft. Also are included the step of detaching the aircraft from the one of the platform and the frame when the take-off condition is attained. Further included is a step of decelerating the one of the platform and the frame subsequent to take-off of the aircraft.

Clause 4 A method for decelerating an aircraft for landing, the method includes the steps of determining the position and movement of an incoming aircraft relative to a platform and moving the platform to match the movement of the aircraft. The method also includes the steps of attaching the incoming aircraft onto the platform and decelerating the platform.

Clause 5 A method for decelerating an aircraft for landing, the method includes the steps of determining the position and movement of an incoming aircraft relative to a platform and moving the platform to match the movement of the aircraft. The method also includes the steps of attaching the incoming aircraft onto the platform and decelerating the platform. The step of moving the platform includes initiating moving of the platform with the aircraft passing over a threshold of the runway.

Clause 6 A method for decelerating an aircraft for landing, the method includes the steps of determining the position and movement of an incoming aircraft relative to a platform and moving the platform to match the movement of the aircraft. The method also includes the steps of attaching the incoming aircraft onto the platform and decelerating the platform. This method further includes the steps of detecting the orientation of the wheels of the aircraft and adjusting the platform to match the orientation of the wheels.

While various embodiments have been described above, this disclosure is not intended to be limited thereto. Variations can be made to the disclosed embodiments that are still within the scope of the appended claims.

What is claimed is:

1. A system for controlling aircraft movement, the system comprising:
   a frame extending across a width of a runway;
   an attachment mechanism coupled to the frame and configured to be releasably connected to a portion of an aircraft; and
   a conveying system configured to, with the aircraft coupled to the frame during take-off of the aircraft, accelerate the aircraft, and wherein the conveying system is configured to, during landing of the aircraft, decelerate the aircraft.

2. The system of claim 1, wherein the conveying system is further configured to accelerate the aircraft by moving a platform that is coupled to the aircraft, and wherein the conveying system comprises:
   a first rail positioned at a first side of the runway;
   a second rail positioned at a second side of the runway; and
   a power supply electrically coupled to the first rail and the second rail.

3. The system of claim 2, wherein the platform is configured to be moved within a recess during the take-off of the aircraft and the landing of the aircraft.

4. The system of claim 2, wherein a top surface of the platform is substantially parallel with a surface of a taxiway.

5. The system of claim 1, wherein the conveying system comprises:
   at least one rail; and
   a power supply electrically coupled to the at least one rail.

6. The system of claim 1, wherein the conveying system comprises a first rail positioned on a first side of the runway, a second rail positioned on a second side of the runway, and an electrical power supply coupled to the first rail and to the second rail, and further comprising a platform coupled to the frame and to the conveying system.

7. The system of claim 6, wherein the platform comprises a first magnet spaced apart from a second magnet, wherein the first magnet is configured to levitate over the first rail while the electrical power supply supplies electrical energy to the first rail, and wherein the second magnet is configured to levitate over the second rail while the electrical power supply supplies electrical energy to the second rail.

8. The system of claim 7, wherein the electrical power supply is configured to supply power, to the first rail and the second rail, to exert an electromagnetic force on the first magnet and on the second magnet, the electromagnetic force configured to cause linear movement of the platform.

9. The system of claim 1, further comprising a controller, wherein the frame comprises a first component, a second component spaced apart from the first component, and a third component spaced apart from the first component and the second component, wherein the attachment mechanism comprises a first clamp mechanism coupled to the first component, a second clamp mechanism coupled to the second component, and a third clamp mechanism coupled to the third component, and wherein the controller is in communication with the first clamp mechanism, the second clamp mechanism, the third clamp mechanism, and the conveying system.

10. The system of claim 1, wherein the conveying system comprises a propulsion driving mechanism coupled to the frame.

11. The system of claim 1, wherein the frame includes a surface configured to orient the aircraft at an angle with respect to a direction of movement of the frame.

12. The system of claim 1, wherein the attachment mechanism is configured to be coupled to a portion of the aircraft during acceleration or deceleration of the frame and decoupled from the portion of the aircraft to permit the aircraft to lift off of the frame during the take-off of the aircraft.

13. The system of claim 1, wherein the attachment mechanism includes a wheel block configured to be positioned on opposing sides of a wheel of the aircraft.

14. The system of claim 1, further comprising a controller configured to receive data from sensors on the frame and to control an orientation of a top surface of the frame based on the data and based on an orientation of the aircraft during the landing of the aircraft.

15. The system of claim 14, wherein, to facilitate receipt of the aircraft onto the frame, the controller is further configured to move the top surface of the frame based on a pitch, a yaw, a roll, or a combination thereof, of the aircraft.

16. A method for controlling aircraft movement, the method comprising:
    moving a frame to match a speed and position of an aircraft, the frame extending across a width of a runway;
    attaching an attachment mechanism coupled to the frame to a portion of the aircraft;
    during landing of the aircraft, decelerate the aircraft via a conveying system; and
    during take-off of the aircraft, accelerate the aircraft.

17. The method of claim 16, wherein the conveying system comprises:
    at least one rail; and
    a power supply electrically coupled to the at least one rail.

18. The method of claim 17, wherein the attachment mechanism comprises a first clamp mechanism coupled to a first component of the frame, a second clamp mechanism coupled to a second component of the frame, and a third clamp mechanism coupled to a third component of the frame.

19. The method of claim 16, wherein the conveying system comprises a propulsion driving mechanism coupled to the frame.

20. The method of claim 16, further comprising orienting the aircraft at an angle with respect to a direction of movement of the frame.

\* \* \* \* \*